No. 869,730. PATENTED OCT. 29, 1907.
R. M. RICHARDS.
GRAIN DRILL CLEANER.
APPLICATION FILED FEB. 11, 1907.

3 SHEETS—SHEET 1.

Witnesses
Inventor
R. M. Richards
By
Attorneys

No. 869,730. PATENTED OCT. 29, 1907.
R. M. RICHARDS.
GRAIN DRILL CLEANER.
APPLICATION FILED FEB. 11, 1907.
3 SHEETS—SHEET 2.
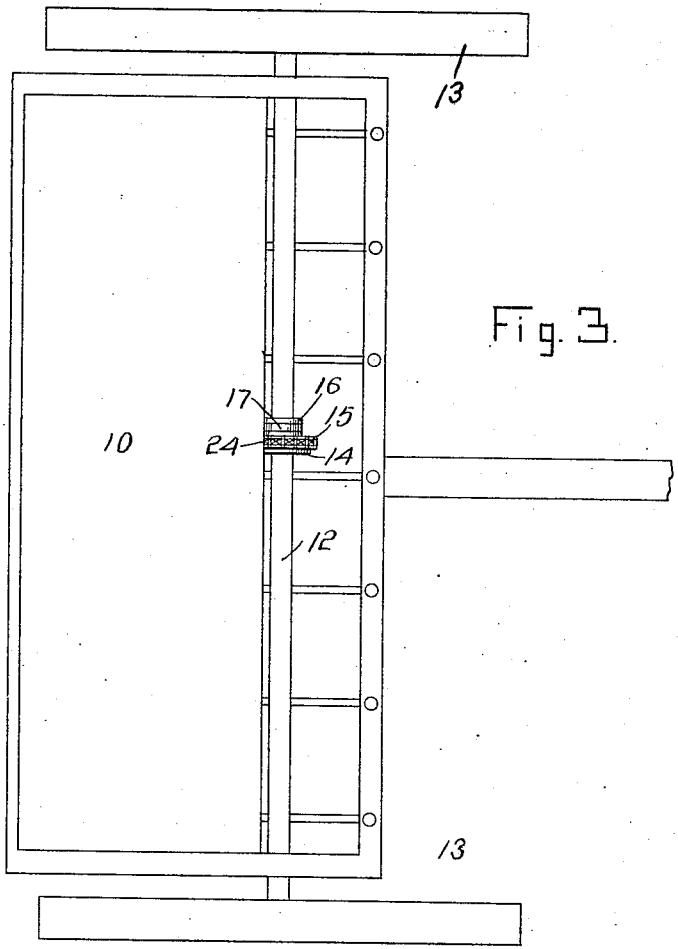
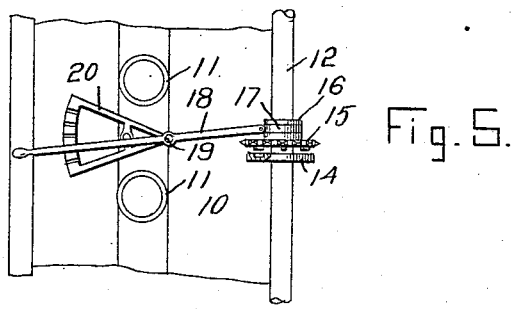

No. 869,730. PATENTED OCT. 29, 1907.
R. M. RICHARDS.
GRAIN DRILL CLEANER.
APPLICATION FILED FEB. 11, 1907.

3 SHEETS—SHEET 3.

Witnesses
Inventor
R. M. Richards.
By
Attorneys.

UNITED STATES PATENT OFFICE.

ROY M. RICHARDS, OF MENDON, NEW YORK.

GRAIN-DRILL CLEANER.

No. 869,730.     Specification of Letters Patent.     Patented Oct. 29, 1907.

Application filed February 11, 1907. Serial No. 356,746.

*To all whom it may concern:*

Be it known that I, ROY M. RICHARDS, a citizen of the United States, residing at the town of Mendon, in the county of Monroe, State of New York, have invented certain new and useful Improvements in Grain-Drill Cleaners; and I do hereby declare the following to be a full, clear, and exact description of the invention, such as will enable others skilled in the art to which it appertains to make and use the same.

This invention relates to attachments for seed drills for cleaning the brush and weeds away from the tubes or boots of the drill.

The cleaning device is so constructed that it may be attached to any form of drill now in use and may be adjusted to suit drills having their boots spaced at different intervals to the boots of other drills.

One of the novel features of my invention resides in the manner of securing the cleaning teeth to the shaft upon which they are supported and with which they rotate so that they may be adjusted to lengthen or shorten them as may be desired.

Figure 1:
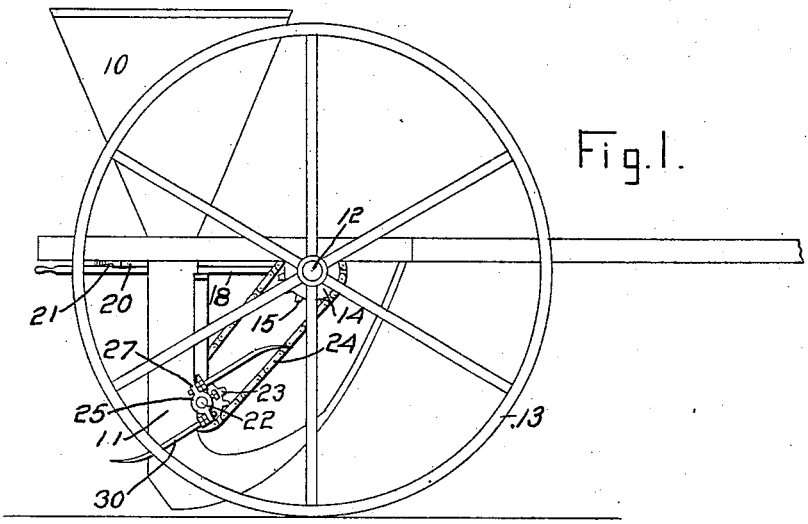
Figure 2:
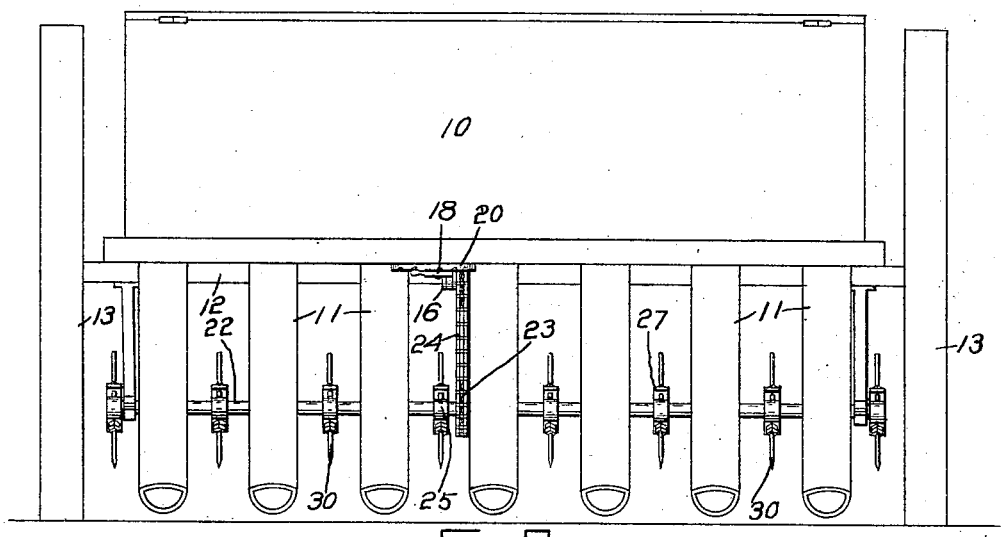
Figure 4:
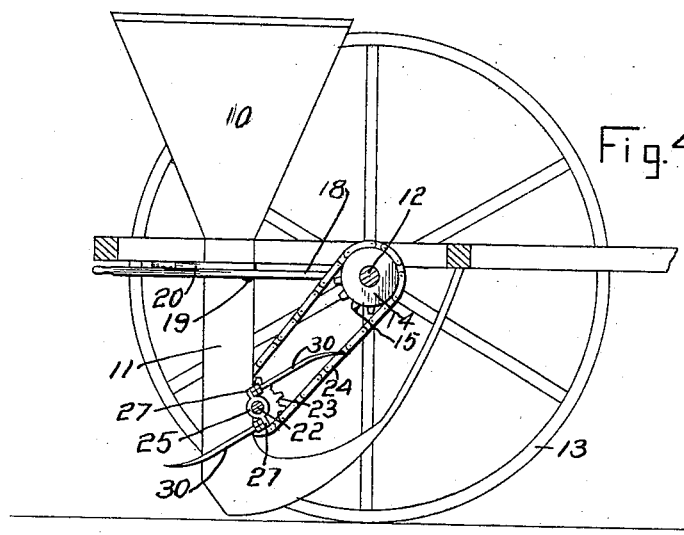
Figure 6:
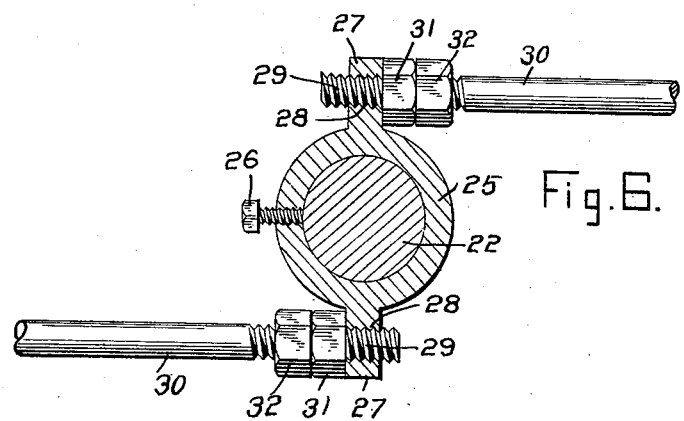

In the accompanying drawings, Figure 1 is a side elevation of a grain drill showing the application of my invention, Fig. 2 is a rear elevation thereof, Fig. 3 is a top plan view, Fig. 4 is a detail vertical transverse sectional view, Fig. 5 is a bottom plan view showing the means for throwing the cleaner shaft into and out of gear, and, Fig. 6 is a detail vertical sectional view through the shaft showing the manner of connecting the cleaning teeth therewith.

Referring more specifically to the drawings there is shown a hopper 10 for containing the seeds to be planted and 11 the seed discharge boots. A shaft or axle 12 carries wheels 13 which support the drill for travel and upon this shaft is fixed one member of a clutch 14 the other member of the clutch being in the form of a sprocket gear 15 which is splined to the shaft 12 and is provided with an integral flange collar portion 16 with which is loosely engaged a collar 17 formed in one end
of the lever 18 which is pivoted as at 19 to the frame of a segmental rack 20 which is supported beneath the hopper 10 and with which coöperates a tongue 21 formed upon the lever 18.

Journaled for rotation upon the frame of this drill is a shaft 22 which carries a sprocket gear 23 with which, and the gear 15, is engaged a sprocket chain 24 it being understood that by the construction previously described, the shaft 22 may be thrown into gear with the shaft 12.

Engaged upon the shaft 22 and held thereon at proper intervals are collars 25 through which are engaged set screws 26 which serve to hold the collars to the shaft for rotation therewith as stated. Formed integral with each of the collars 25 at diametrically opposite points thereon and extending radially from the same are lugs 27 through which are formed threaded bores 28. Received in these bores 28 are the threaded shanks 29 of cleaner teeth 30 which are curved in the direction of their rotation as clearly indicated in the drawings. The threaded portion 29 of each tooth is of considerable extent and serves as a means whereby each tooth may be adjusted to lengthen or shorten it, there being a nut 31 and a jam-nut 32 engaged upon each shank and bearing against the lug 27 in which the tooth is engaged to hold it to its adjusted position and also to prevent it turning laterally and thereby improperly performing its function.

What is claimed is—

In a mechanism of the class described the combination with the drive shaft of a seed drill, of a shaft adapted to be driven from the drive shaft, collars arranged upon the shaft and adjustable longitudinally thereof, said collars having threaded bores formed therethrough, and teeth having threaded shanks engaged in the bores.

In testimony whereof, I affix my signature, in presence of two witnesses.

ROY M. RICHARDS.

Witnesses:
   ETTA M. ELY,
   J. B. RICHARDS.